(12) United States Patent
Kim et al.

(10) Patent No.: US 8,205,164 B2
(45) Date of Patent: Jun. 19, 2012

(54) IMAGE DISPLAY SYSTEM FOR CONTROLLING AUTOMATIC LEVELING OF HEAVY EQUIPMENT

(75) Inventors: Jin Seop Kim, Changwon-si (KR); Chang Soo Lee, Changwon-si (KR); In Woo Kim, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 770 days.

(21) Appl. No.: 12/241,733

(22) Filed: Sep. 30, 2008

(65) Prior Publication Data

US 2009/0089703 A1   Apr. 2, 2009

(30) Foreign Application Priority Data

Oct. 2, 2007   (KR) .................. 10-2007-0099267

(51) Int. Cl.
*G06F 3/048* (2006.01)
*G06F 19/00* (2006.01)

(52) U.S. Cl. ............ 715/764; 715/771; 701/50; 700/83; 340/691.6

(58) Field of Classification Search .................. 715/771, 715/839, 764; 700/279, 83; 701/50; 180/89.14, 180/89.15; 37/906; 340/691.6; 33/328; 280/6.154, 6.153
See application file for complete search history.

(56) References Cited

U.S. PATENT DOCUMENTS

| | | | |
|---|---|---|---|
| 5,404,661 A * | 4/1995 | Sahm et al. | 37/348 |
| 6,191,732 B1 * | 2/2001 | Carlson et al. | 342/357.3 |
| 6,282,477 B1 * | 8/2001 | Gudat et al. | 701/50 |
| 6,343,799 B1 * | 2/2002 | Moyer | 280/6.154 |
| 2003/0001751 A1 * | 1/2003 | Ogura et al. | 340/691.6 |
| 2004/0010359 A1 * | 1/2004 | Koch | 701/50 |
| 2005/0027420 A1 * | 2/2005 | Fujishima et al. | 701/50 |
| 2007/0245578 A1 * | 10/2007 | Clark et al. | 33/365 |

* cited by examiner

*Primary Examiner* — Kieu Vu
*Assistant Examiner* — Blaine T. Basom
(74) *Attorney, Agent, or Firm* — Ladas & Parry LLP

(57) ABSTRACT

An image display system for controlling automatic leveling of heavy equipment is provided. The image display system includes the leveling means for adjusting horizontal levels of a lower frame provided with a traveling means and an upper frame having a cab and installed on an upper part of the lower frame, a sensor unit for sensing posture information of the heavy equipment, a leveler electronic control unit for generating an image signal from the posture information, and an image display unit for displaying the image signal on a display screen. The posture information includes inclination angles of the upper frame and the lower frame sensed on the basis of a horizontal surface against a direction of gravity, an azimuth angle of the heavy equipment sensed against a forward direction of the upper frame, and a swing angle of the upper frame sensed on the basis of a front direction of the lower frame. According to the image display system, the leveling state of the heavy equipment is easily recognized, and the control performance of the heavy equipment is improved.

6 Claims, 5 Drawing Sheets

IMAGE DISPLAY SYSTEM FOR CONTROLLING AUTOMATIC LEVELING OF HEAVY EQUIPMENT

CROSS-REFERENCE TO RELATED APPLICATION

This application is based on and claims priority from Korean Patent Application No. 10-2007-0099267, filed on Oct. 2, 2007 in the Korean Intellectual Property Office, the disclosure of which is incorporated herein in its entirety by reference.

BACKGROUND OF THE INVENTION

1. Field of the Invention

The present invention relates to an image display system for controlling automatic leveling of heavy equipment, and more particularly to an image display system for controlling automatic leveling the heavy equipment by a leveling means, which can display inclined states of an upper frame and a lower frame of the heavy equipment through a dynamic change of a symbol that symbolizes the heavy equipment.

2. Description of the Prior Art

In heavy equipment, such as an excavator, a logging device, a crane, and the like, which is working on an inclined site, an upper frame is inclined to a level surface depending on the ruggedness and inclination of ground. Accordingly, the inclination of an upper frame to a level surface is changed at any time as the upper frame is swiveled, and this causes the work to be done in an unstable state of the equipment. Also, as the center of gravity of the equipment deviates from the center, the danger of overturning of the heavy equipment is increased.

In order to solve this problem, a method of moving the center of gravity of the heavy equipment near to ground through leveling of the upper frame with a level surface against the direction of gravity on an inclined site has been used.

Conventionally, a user should determine the leveling time by sensing the inclination of the heavy equipment depending on the user's sensitivity, and measure the leveling state himself.

In the case of the leveling control depending on the user's sensitivity, the user cannot properly recognize the slope of the ground and the slope of the upper frame, even though a danger of overturning of the heavy equipment still exists, and thus cannot perform the leveling at proper time.

Also, in the case of performing the leveling at all times, the user should judge the leveling state through comparison of the leveling state with a surrounding environment or depending on the user's own sensitivity, and this causes incorrect results of leveling with the user's fatigue increased.

Accordingly, the control performance of the heavy equipment is greatly lowered when the user performs diverse manipulation inputs, manually performs the leveling, or conducts work at night.

SUMMARY OF THE INVENTION

Accordingly, the present invention has been made to solve the above-mentioned problems occurring in the prior art while advantages achieved by the prior art are maintained intact.

One object of the present invention is to provide an image display system for controlling automatic leveling of heavy equipment, which can display an image to which information on an inclination of the heavy equipment, a swing angle of an upper frame, a traveling direction of the heavy equipment, a selected leveling control mode, warning conditions during the leveling control, and the like, is added.

Another object of the present invention is to provide an image display system for controlling automatic leveling of heavy equipment, which can recognize accurate information as well as enable a user to recognize an inclined state of the heavy equipment.

In one aspect of the present invention, there is provided an image display system of heavy equipment in which a lower frame provided with a traveling means and an upper frame having a cab are combined together by a leveling means, wherein the heavy equipment is displayed as a symbol, and inclination of the lower frame and the upper frame is displayed as an operation change of the symbol.

The symbol may be divided into a front symbol seen from the front of the heavy equipment and a side symbol seen from the side of the heavy equipment.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, an image display system for controlling automatic leveling of heavy equipment according to preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
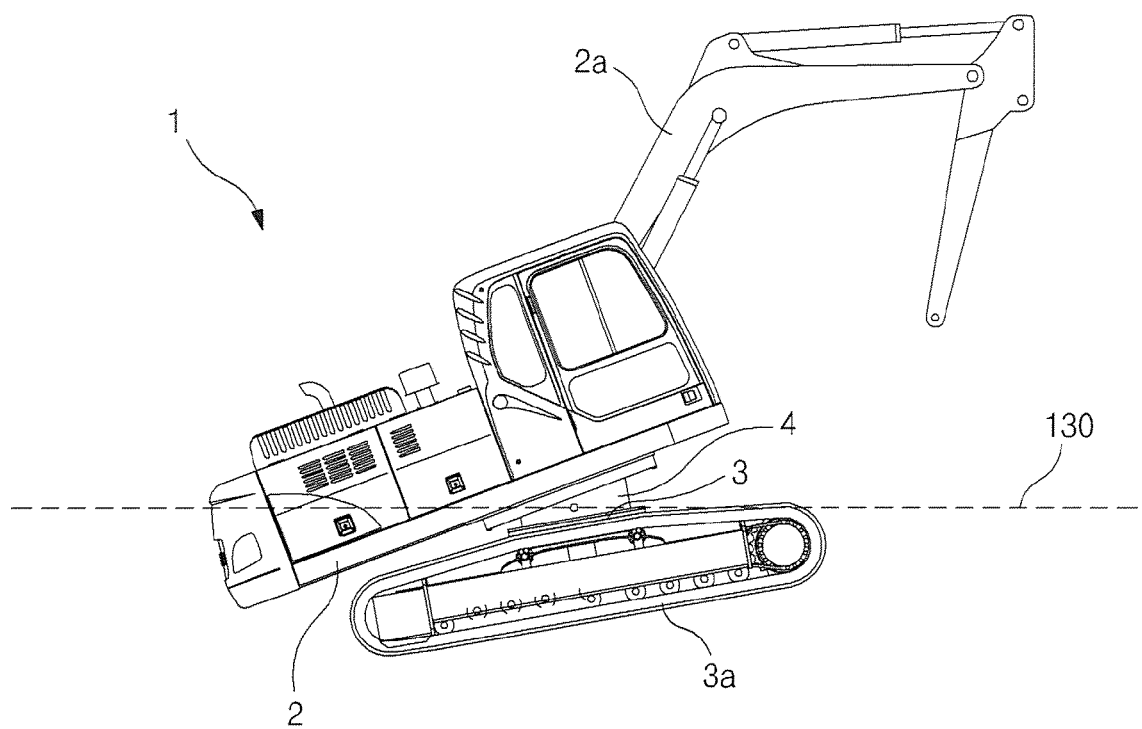
FIG. 1 is a side view of heavy equipment having a leveling means according to an embodiment of the present invention.
Figure 2:
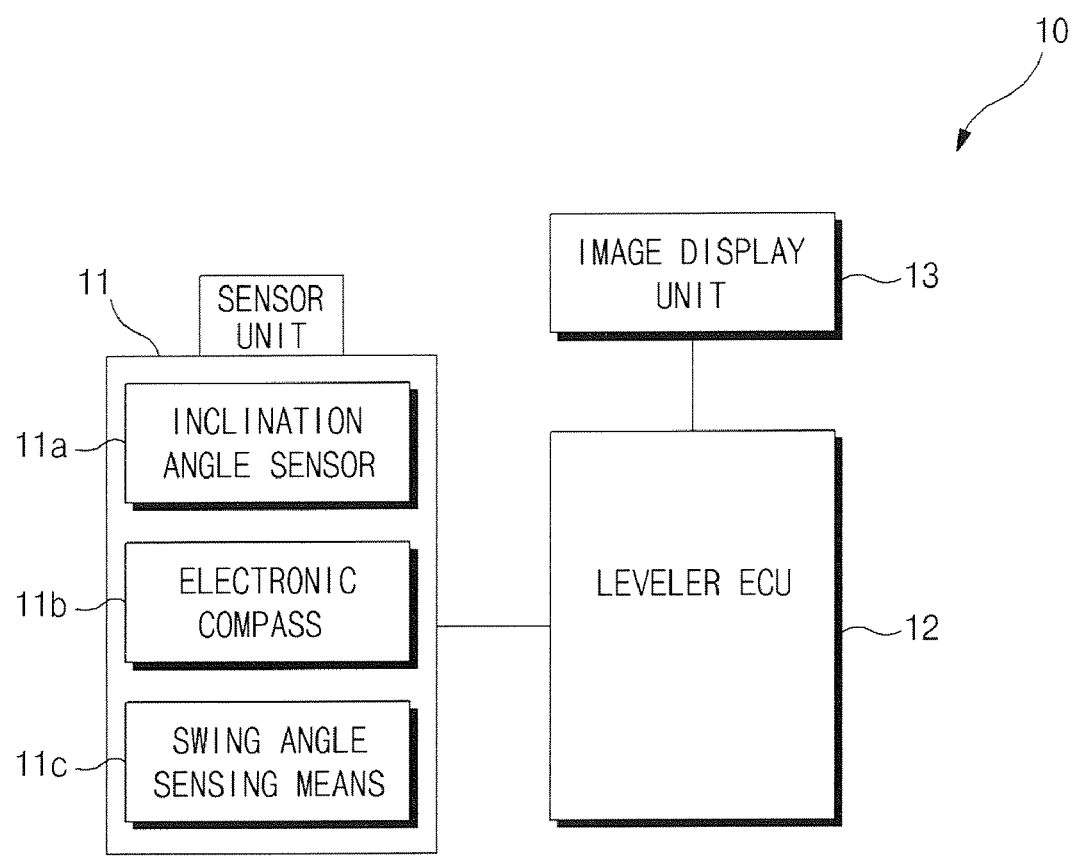
FIG. 2 is a block diagram illustrating the construction of an image display system for controlling automatic leveling of heavy equipment according to an embodiment of the present invention.
Figure 3:
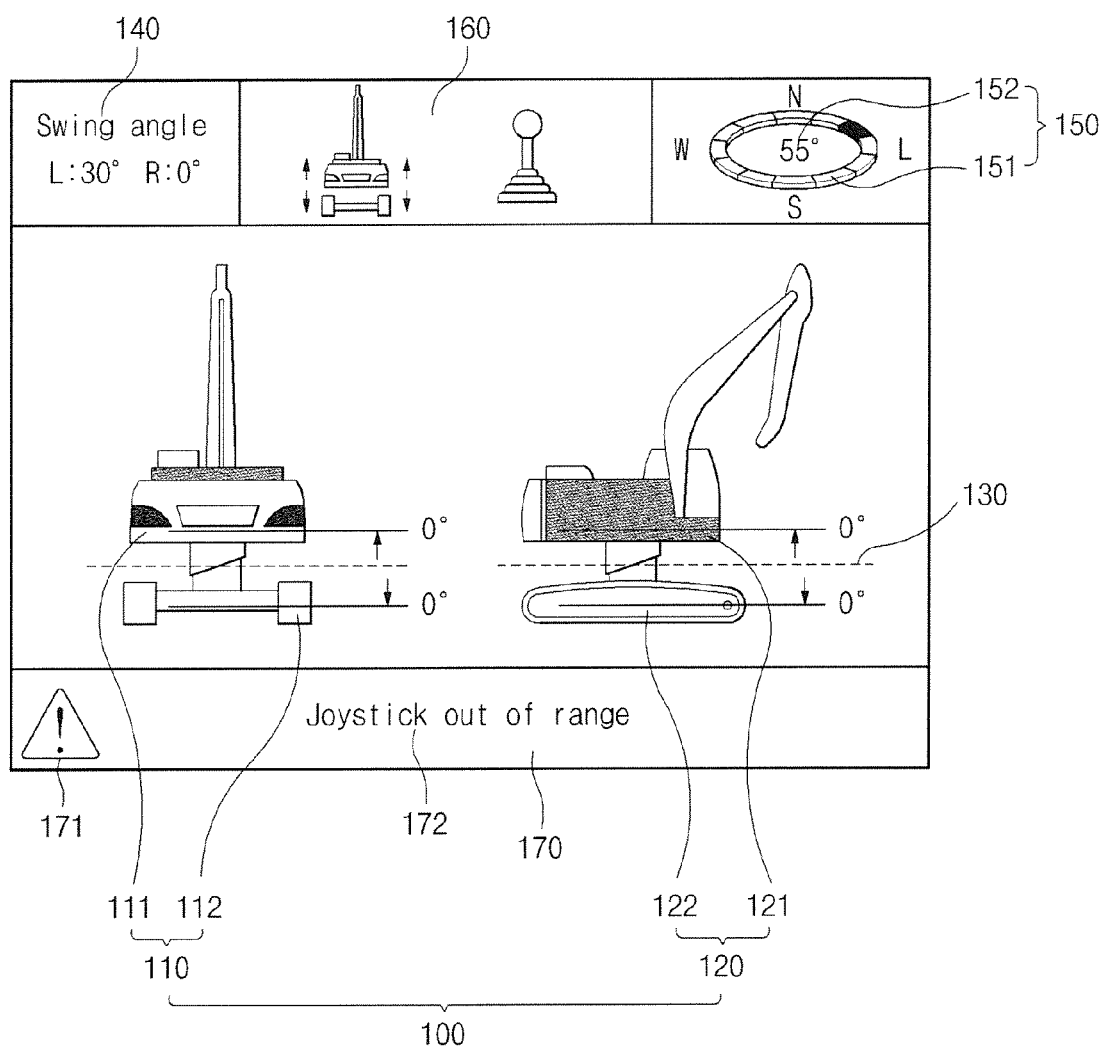
FIG. 3 is a view illustrating an image display state of an image display system for controlling automatic leveling of heavy equipment according to an embodiment of the present invention.
Figure 4:
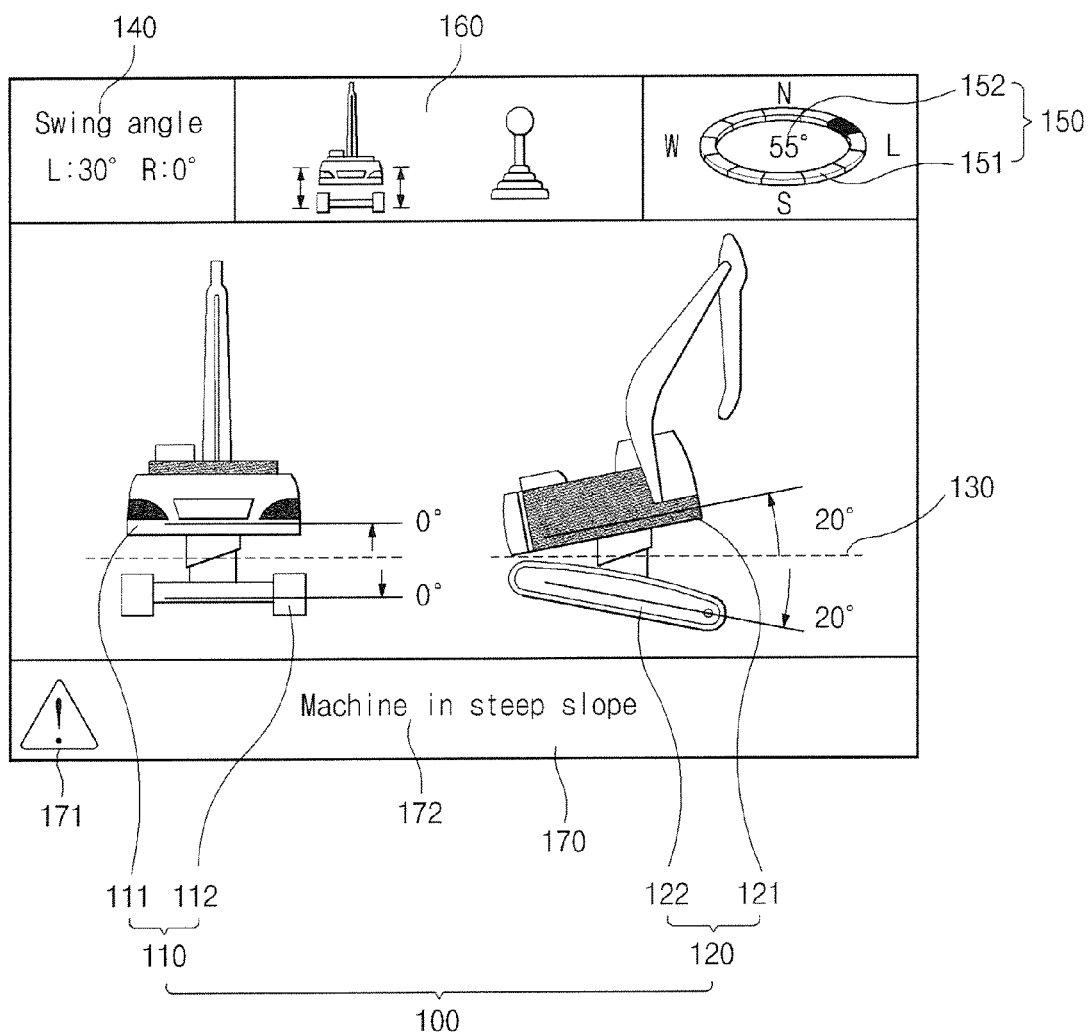
FIG. 4 is a view illustrating an image display state of an image display system for controlling automatic leveling of heavy equipment according to another embodiment of the present invention.
Figure 5:
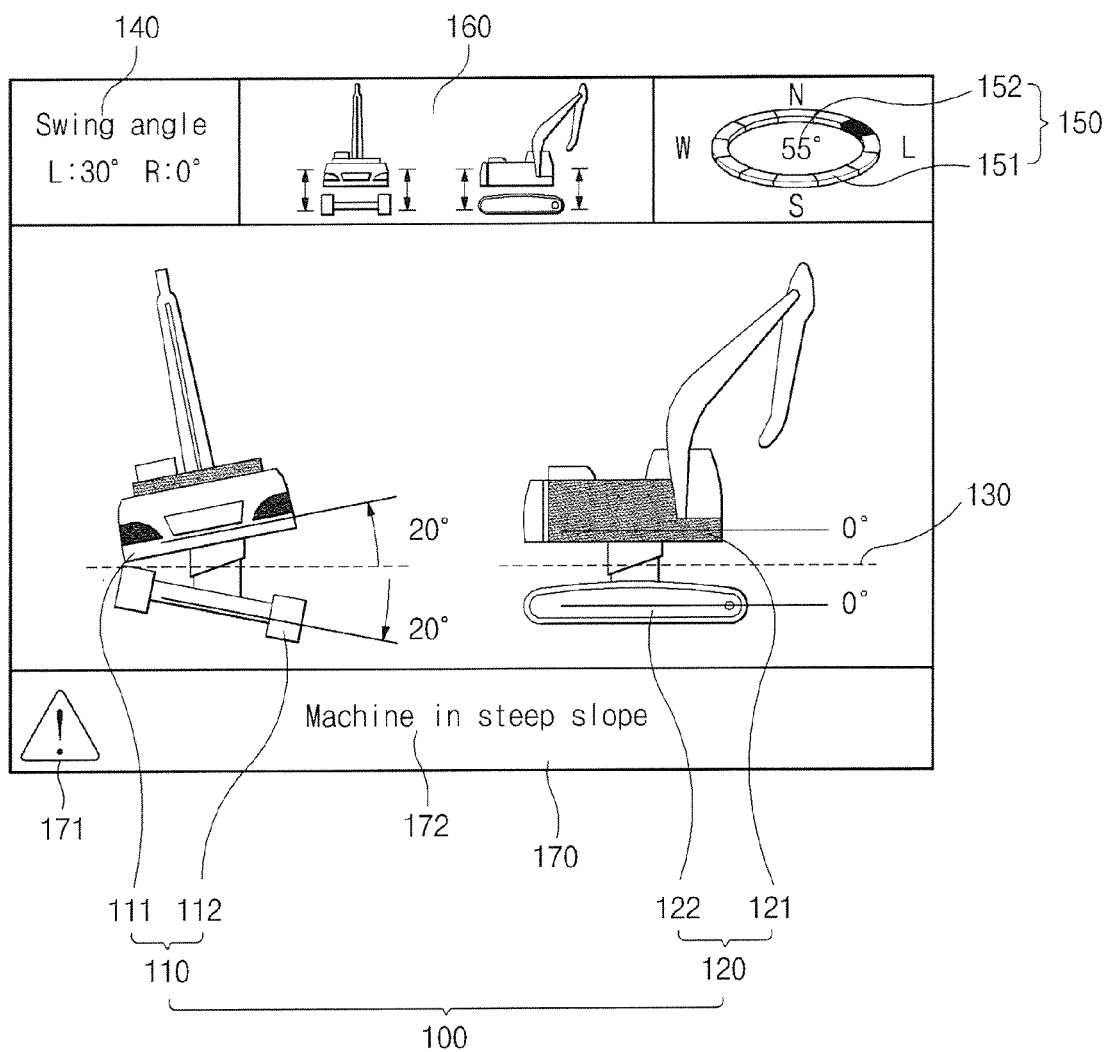
FIG. 5 is a view illustrating an image display state of an image display system for controlling automatic leveling of heavy equipment according to still another embodiment of the present invention.

FIG. 1 is a side view of heavy equipment having a leveling means according to an embodiment of the present invention, and FIG. 2 is a block diagram illustrating the construction of an image display system for controlling automatic leveling of heavy equipment according to an embodiment of the present invention. FIG. 3 is a view illustrating an image display state of an image display system for controlling automatic leveling of heavy equipment according to an embodiment of the present invention, FIG. 4 is a view illustrating an image display state of an image display system for controlling automatic leveling of heavy equipment according to another embodiment of the present invention, and FIG. 5 is a view illustrating an image display state of an image display system for controlling automatic leveling of heavy equipment according to still another embodiment of the present invention.

Referring to FIGS. 1 to 3, an image display system for controlling automatic leveling of heavy equipment 1 with a lower frame 3, an upper frame 2 and a leveling means 4, the lower frame 3 having traveling means 3a, the upper frame 2 tiltably and swingably connected to the lower frame 3, and the leveling means 4 for adjusting horizontal levels of the upper frame 2, according to an embodiment of the present invention, which includes a sensor unit 11 for sensing posture information of the heavy equipment, a leveler electronic control unit 12 for generating an image signal from the posture information, and an image display unit 13 for displaying the image signal on a display screen.

In the case of displaying the posture information of the heavy equipment 1 having a leveling means 4, the posture information of the heavy equipment 1 includes inclination angles (which include pitching angles and rolling angles) of the upper frame 2 and the lower frame 3 on the basis of a horizontal surface against a direction of gravity, an azimuth angle of the heavy equipment 1 against a forward direction of the upper frame 2, and a left/right rotation angle (hereinafter referred to as a "swing angle") of the upper frame 2 on the basis of a front direction of the lower frame 3.

The sensor unit 11 includes inclination angle sensors 11a installed on one side of the upper frame 2 and the lower frame 3, respectively, an electronic compass 11b installed on one side of the upper frame 2, and a swing angle sensing means 11c installed in the center position of the leveling means 4.

It is preferable that the swing angle sensing means 11c is comprised of a potentiometer. The potentiometer 11c senses the swing angle of the upper frame 2, and provides the sensed swing angle signal to the leveler electronic control unit 12.

The inclination angle sensor 11a senses pitching angles and rolling angles of the upper frame 2 and the lower frame 3, respectively, and the electronic compass 11b senses the azimuth angle of the heavy equipment 1 against the forward direction of the upper frame 2, and provides the respective sensed signal to the leveler electronic control unit 12.

The sensed signals of the inclination angle, the azimuth angle, and the swing angle are transmitted to the leveler electronic control unit 12 using CAN (Controller Area Network) communications and so on. The leveler electronic control unit 12 processes the electric signals, generates an image display signal or a numeral display signal corresponding to the inclination, the azimuth angle, and the swing angle according to the image display system to be described later, and transmits the image display signal or the numeral display signal to an image display unit 13.

For example, if the inclination is sensed in an analog form, the leveler electronic control unit 12 converts the analog signal into a digital value, and transmits the digital value to the image display unit 13 through the CAN communications. In addition to the leveler electronic control unit 12, the potentiometer 11c provided with a digital conversion means may convert the swing angle into a digital value, and directly transmit the digital value to the image display unit 13 using the CAN communications.

Hereinafter, the construction and operation of the image display system of heavy equipment having a leveling means according to an embodiment of the present invention, which uses the inclination angles, the azimuth angle, and the swing angle to enable a user to immediately recognize the posture of the heavy equipment 1, will be described in detail.

According to the image display system of heavy equipment having a leveling means according to an embodiment of the present invention, the heavy equipment 1 is displayed as a symbol 100 that symbolizes the heavy equipment 1, and the inclination of the heavy equipment 1 is displayed as the operation change of the symbol 100 on the image display unit.

The inclination of the heavy equipment 1 may be classified into the inclination of the upper frame 2 and the inclination of the lower frame 3, and symbols 111 and 121 of the upper frame, being displayed on a display screen in which the inclination of the upper frame 2 is changed to match the horizontal plane against the direction of gravity, is tilted as much as the corresponding inclination thereof.

On the other hand, since the inclination of the lower frame 3 coincides with the slope of the ground in the present position, it is displayed on the same screen so as to provide the ground inclination to the user.

The symbol 100 of the heavy equipment corresponds to the simplified shape of the heavy equipment 1. In the case where the heavy equipment 1 is traveling, the moving state of the traveling means 3a on the lower frame 3 may be displayed on symbols 112 and 122 of the lower frame using animation, and in the case where a boom 2a mounted on the upper frame 2 is operated, the operation state of the boom may be displayed on the symbols 111 and 121 of the upper frame using animation.

On the other hand, the symbol 100 may be divided into a front symbol 110 seen from the front of the heavy equipment and a side symbol 120 seen from the side of the heavy equipment.

The leveling means 4 performs a leveling adjustment function with respect to the change of the pitching angle and the rolling angle of the heavy equipment 1, for example, with respect to the inclined state of the upper frame 2 or the lower driving structure 3. In this case, the symbol 100 is displayed, being divided into a front symbol 110 seen from the front (or rear) of the heavy equipment to indicate the change of the rolling angle, and a side symbol 120 seen from the side (i.e., left or right side) of the heavy equipment to indicate the change of the pitching angle.

In the case of displaying a three-dimensional symbol, the recognition of the pitching angle and the rolling angle may be lowered depending on the angle of vision. However, in the case of displaying two-dimensional symbols, the corresponding inclination can be clearly recognized.

In order to heighten the rapidity and clearness in recognizing the inclination, a reference line 130 may be added to the symbol 100. This reference line 130 indicates a horizontal line corresponding to a horizontal surface against the direction of gravity. Since the reference line is displayed in the center of the symbol 100 that corresponds to the leveling means 4, the respective symbols 111, 112, 121, and 122 of the upper frame and the lower frame can be clearly discriminated from one another. That is, on an upper side of the reference line 130, the symbols 111 and 121 of the upper frame are arranged, and on a lower side thereof, the symbols 112 and 122 of the lower frame are arranged to increase the visibility.

It is preferable that the change of the pitching angle and the rolling angle is displayed through not only the operation change of the symbol 100 but also a numeral 131 that indicates the corresponding angle value. Accordingly, angle information on the actual degree of inclination is provided to a user so that the user can clearly recognize the inclination of the heavy equipment even in a state that the user's ability to concentrate all his/her energies is deteriorated due to the vibration of the heavy equipment, the rotation of the upper frame, noise in an external environment, and the like.

Also, a swing angle 140 of the upper frame can be further displayed on the image display device. This is to provide related information on the rotation state of the upper frame to the user without the necessity of user's looking into the front lower part of the heavy equipment.

The swing angle 140 may be displayed, for example, as "L: 30° R: 0°", and this swing angle indicates the rotated state of the left swing by 30°. In the case of swing by 360° to the left, the swing angle is displayed as "L: 30° R: 0°", "L: 120° R: 0°", "L: 270° R: 0°", and "L: 359° R: 0°" in order. After completing one revolution, the swing angle is displayed as "L: 0° R: 0°." Accordingly, the user can directly recognize the current swing direction and the swing angle.

In addition, the azimuth angle 150 of the heavy equipment may be further displayed on the image display device. For example, as illustrated in FIG. 3, east (E), west (W), south (S), and north (N) are displayed on the circumference 151 of an ellipse, which is divided into parts having the same angle, and the color of one of the parts corresponding to the azimuth angle is changed. Also, in the center of the ellipse 151, the azimuth angle is displayed as a numeral 152. Since the azimuth angle 152 refers to the forward direction of the upper frame, the user can recognize the current working direction, and thus can perform the work in a correct direction even in a place, of which the azimuth cannot be recognized due to an external environment, such as a desert or a polar region.

In addition, a mode symbol 160, which indicates a leveling control mode of the upper frame, may be further displayed on the image display device 13 including the image display unit 10. The leveling control of the heavy equipment is briefly divided into a manual leveling mode and an automatic leveling mode. The automatic leveling mode may be further divided into an automatic leveling mode for a horizontal surface, a track-based leveling mode based on the lower frame, an automatic re-leveling mode re-performed under specified conditions after the automatic leveling control is performed, and the like.

By displaying the leveling mode, which is currently adopted in the heavy equipment among the diverse leveling control modes, using a simple mode symbol 160, a user can immediately and clearly recognize the leveling mode being currently adopted.

A warning 170 may be further displayed on the image display device with respect to warning conditions occurring during the leveling control process of the upper frame. This warning 170 may be displayed as a warning mark 171 or a warning expression 172. For example, under diverse warning conditions set by a user, for example, in the case where a threshold range, in which leveling control is possible, approaches, or danger of overturning increases as the center of gravity is moved, the warning mark 171 or a related message can be significantly displayed as the warning expression 172. Accordingly, the user can confirm the stop conditions caused by the self algorithm of the leveling means through the warning expression, and use the warning expression as information to remove the cause of the warning.

In addition, it is preferable that the symbol of the heavy equipment, the symbol of the leveling mode, the swing angle, the azimuth angle, the warning mark, and the warning expression are displayed by colors to increase the user's recognition. In this case, complementary colors may be used. For example, yellow or white color may be used with black color for a background. Also, the color of the upper frame, which is important in the leveling control, may differ from the colors of other parts, or the traveling state may be indicated by displaying the taillight of the heavy equipment with red color, white color, and the like.

The image display of the heavy equipment having a leveling means can be constructed through selective combination of the swing angle 140, the azimuth angle 150, the mode symbol 160, and the warning 170 as the inclination of the upper frame 2 and the lower frame 3 is separately displayed as dynamic changes. It is most preferable that all the constituent elements are displayed on the image display device, and in this case, the user can synthetically recognize the posture information of the heavy equipment.

As described above, according to the image display system of heavy equipment having a leveling means according to an embodiment of the present invention, symbols of the upper frame and the lower frame are displayed as dynamic changes in accordance with the inclination, and thus the user can immediately recognize information on the current leveling state of the heavy equipment.

In addition, since the swing angle of the upper frame, a forward azimuth angle of the heavy equipment, the selected leveling control mode, the warning conditions during the leveling control, and the like, are additionally displayed on the image display device, the synthetic posture information of the heavy equipment can be displayed at the same time.

In addition, since numeral information is displayed on the image display device together with the dynamic change of the symbol, the inclined angle of the heavy equipment can be correctly recognized.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An image display system for controlling automatic leveling of heavy equipment with a lower frame, an upper frame, and leveling means, the lower frame having traveling means, the upper frame being tiltably and swingably connected to the lower frame, and the leveling means being for adjusting horizontal levels of the upper frame, the image display system comprising:
a sensor unit, adapted to sense posture information of the heavy equipment;
a leveler electronic control unit, adapted to generate an image signal from the posture information; and
an image display unit, adapted to display the image signal on a display screen,
wherein the posture information includes inclination angles of the upper frame and the lower frame sensed on the basis of a horizontal surface against a direction of gravity, an azimuth angle of the heavy equipment sensed against a forward direction of the upper frame, and a swing angle of the upper frame sensed on the basis of a front direction of the lower frame,
wherein the sensor unit comprises:
inclination angle sensors, installed on one side of each of the upper frame and the lower frame, for sensing pitching angles and rolling angles of each of the upper frame and the lower frame,
an electronic compass, installed on one side of the upper frame, for sensing the azimuth angle of the heavy equipment against the forward direction of the upper frame, and swing angle sensing means, installed briefly in a center position of the leveling means, for sensing the swing angle of the upper frame, wherein the image display unit displays the heavy equipment as a symbol that symbolizes the heavy equipment, and the pitching and rolling angles of each of the lower frame and the upper frame is displayed as an operation change of the symbol on the image display unit, wherein, on the symbol, a horizontal line against a direction of gravity is displayed as a reference line of the leveling means, and wherein the azimuth angle of the heavy equipment is further displayed on the image display unit.

2. The image display system of claim 1, wherein the symbol is divided into a front symbol seen from the front of the heavy equipment and a side symbol seen from a side of the heavy equipment.

3. The image display system of claim 1, wherein the pitching and rolling angles are displayed as a numeral together with an operation change of the symbol.

4. The image display system of claim 1, wherein a leveling control mode is further displayed on the image display unit as a symbol.

5. The image display system of claim 1, wherein a warning for reporting warning conditions during the leveling control of the heavy equipment is further displayed on the image display unit.

6. The image display system of claim 1, wherein the symbol is displayed with colors to increase visibility.

* * * * *